United States Patent
Seamans et al.

(10) Patent No.: US 6,911,597 B2
(45) Date of Patent: Jun. 28, 2005

(54) ARCHITECTURAL MOLDINGS FOR PROTECTING, CONCEALING AND ACCESSING INDOOR WIRING AND CABLES

(76) Inventors: James D. Seamans, 143 E. Wilde Yaupon, The Woodlands, TX (US) 77381; William J. Seamans, 19651 Brassie Pl., Gaithersburg, MD (US) 20886; David L. Seamans, 1534 Beyer Rd., Saginaw, MI (US) 48601

( * ) Notice: Subject to any disclaimer, the term of this patent is extended or adjusted under 35 U.S.C. 154(b) by 0 days.

(21) Appl. No.: 10/337,166

(22) Filed: Jan. 6, 2003

(65) Prior Publication Data

US 2003/0106702 A1 Jun. 12, 2003

Related U.S. Application Data

(63) Continuation-in-part of application No. 09/836,022, filed on Apr. 17, 2001, now Pat. No. 6,504,098.

(51) Int. Cl.$^7$ ................................................. H02G 3/04
(52) U.S. Cl. ..................... 174/48; 174/68.1; 174/68.3; 174/95; 52/220.5; 439/120; 439/209
(58) Field of Search .............................. 174/68.1, 68.3, 174/48, 95, 96, 97, 101; 362/145; 52/220.5, 210, 211; 439/120, 209, 212

(56) References Cited

U.S. PATENT DOCUMENTS

| | | | | |
|---|---|---|---|---|
| 3,676,974 A | * | 7/1972 | Daly | 174/48 |
| 4,800,696 A | * | 1/1989 | Miller et al. | 174/48 |
| 5,126,509 A | | 6/1992 | Yen | |
| 5,336,849 A | * | 8/1994 | Whitney | 174/48 |
| 5,357,053 A | * | 10/1994 | Manaras | 174/48 |
| 5,426,901 A | * | 6/1995 | Indracek | 52/288.1 |
| 5,463,835 A | | 11/1995 | Wood | |
| 5,823,655 A | * | 10/1998 | Brooks | 362/145 |
| 6,202,380 B1 | | 3/2001 | Trutwin et al. | |

* cited by examiner

Primary Examiner—Dhiru R. Patel
(74) Attorney, Agent, or Firm—Mary J. Gaskin

(57) ABSTRACT

A system of architectural moldings that form a passage for electrical wiring (30), coaxial cables, fiber optic cables, and associated devices used in transmitting low-voltage power, communication, and control signals. The architectural moldings may also be used to cover pre-existing wiring raceways and conduits. The system may be installed when constructing a building or when retrofitting an existing structure. The moldings can be removably mounted on the interior surfaces of residential and commercial structures in a manner that allows for easy removal and replacement of some or all of the moldings without disturbing the enclosed wiring and cables or harming finished surfaces. The moldings may be made of wood, polyurethane, fiberboard, or any material suitable for manufacturing pieces that resemble baseboards, cornice moldings, chair rails, casings, or other interior millwork. The system of moldings facilitates upgrades or modifications to the number, type, or placement of wiring, cables, outlets, jacks, or associated devices.

28 Claims, 11 Drawing Sheets

ARCHITECTURAL MOLDINGS FOR PROTECTING, CONCEALING AND ACCESSING INDOOR WIRING AND CABLES

BACKGROUND OF THE INVENTION

1. Field of the Invention

This application is a continuation in part of application Ser. No. 09/836,022, which was filed on Apr. 17, 2001, and which issued as U.S. Pat. No. 6,504,098. This invention relates to coverings or enclosures for electrical wiring and cables. More particularly, it relates to novel and improved protective architectural moldings that provide channels for electrical wiring, cables, and associated devices. Sections of the moldings may be easily removed and reinstalled to facilitate initial installation and modifications to the electrical wiring and cables used for automation, communication, control, entertainment, networking, and/or security systems.

2. Description of the Prior Art

Recent years have brought unprecedented advancement in communication, entertainment, computer networking, security, automation, and control systems for homes and commercial buildings. Most existing homes were not built to accommodate these new technologies. Furthermore, the current rate of change in these technologies makes it very difficult to pre-wire new "smart" homes and buildings to fully anticipate future needs and opportunities. The design philosophy for these new systems is typically one of "star" or "hub and spoke" topography that requires most devices to be connected individually back to a central hub or connection point. The star topography requires an increasing number of wires and cables in greater lengths, compounding the difficulty of accommodating the new technologies. As a result, an unmet need exists for an attractive, cost-effective, and easily modifiable means of accommodating the wiring and cables for these complex electronic systems in existing structures and for future-proofing new construction for the technologies being developed.

Existing finished structures, in particular, present difficulties to installing such systems or networks due to the complications of running wiring and cables in the interior of walls that have already been covered. Snaking electrical lines vertically in the space between wall studs is feasible for short runs of wiring or cable to complete the last few feet of connection to a device or jack. The greater need, however, is to link all the cables and wires in a generally horizontal direction back to a central connection and control hub. However, running wiring and cables horizontally through the studs is difficult, time-consuming, and disruptive to the finished structure. Portions of the wallboard must be cut out, holes drilled through or notches cut in the studs, and the wall surfaces must be patched and refinished after installation. The drilling of holes or notching of studs can weaken the structure. The demolition and repair procedure is often much more costly and time-consuming than the actual running of cables. The installer risks running into existing electrical power lines, plumbing lines, or other obstructions concealed within the walls, ceilings, and floors. Exterior walls and shared walls between adjacent dwelling spaces can make installing these additional wires and cables nearly impossible due to the presence of fiberglass or foam weather insulation, sound insulation, or fire walls.

Surface-mounted wiring raceways and conduits with snap-on covers have been designed for carrying electrical wires, but their use detracts from the appearance of a residence or professional office. Some of these raceways are surface-mounted on walls and other interior surfaces along with existing moldings. Others may take the place of baseboards and are made of materials such as metal or plastic, which have no resemblance to classical wood millwork. Generally, they are considered undesirable for residences because they look like wire raceways rather than finished interior trim that complements the appearance of a home. Furthermore, baseboard-style raceways do not provide means for continuing wiring and cables around doors, windows, or other wall openings to reach any point in the room or to connect these same wires and cables back to a central control hub.

Interior and exterior millwork has been used for centuries to provide an attractive, finished look to homes and commercial structures. However, to date, millwork has not been designed to provide a channel for electrical wiring and cables that can extend completely around the perimeter of rooms via baseboard, casings, crown moldings and related connection moldings. Further, ordinary millwork cannot provide easy access for installation and modification of the wiring, cables, and related electrical devices via removable portions of the molding.

Customary methods of installing standard moldings use finish nails, staples, and/or adhesives to attach them to a structure. Setting of the nails or staples below the surface of the molding then requires the multi-step process of filling the resultant indentations with wood putty or the like, sanding, priming, and painting or staining the exposed surfaces. Performing these steps on the moldings after installation is time-consuming and inefficient compared to painting or staining prior to installation, due to non-ergonomic working positions and the care required to avoid getting finish treatments on adjacent surfaces.

Since standard means of installing moldings does not permit it to be easily removed, subsequent maintenance or remodeling (such as painting, stripping, staining, wallpapering, changing flooring, etc.) requires a relatively high degree of care to perform these steps on the moldings and/or adjacent surfaces.

SUMMARY OF THE INVENTION

Applicant's invention constitutes moldings with exposed surfaces that are similar in appearance to those of ordinary architectural interior or exterior moldings presently used in homes and commercial structures. The moldings are designed to provide at least one channel or passageway for wiring, cables, and other power, communication, networking, and control transmissions, or to cover existing wiring conduits and raceways. In addition, the invention includes the combination of these pieces with each other and/or with interior wall, floor, or ceiling space penetrations in order to complete all or a portion of a computer network, audio, video, security, communication, control or automation system in a residential or commercial structure.

An object of this invention is to provide a system for installing wiring and cables that is easier and faster than going through studs in the walls.

In addition, some or all of the moldings are designed so that sections may be easily removed and reinstalled in order to facilitate installation and modification of the covered wiring and cables. Means of removably attaching portions of the moldings of the present invention include the following: interlocking joinery such as rabbet, scarf, dovetail, finger, mortise and tenon, or lap joints, mating, or matching pieces; a hook and loop fastening system such as Velcro®; reclosable fasteners such as the 3M Dual Lock™ fastening system; double-stick foam tape; push fasteners; row boat fasteners; removable/repositionable tape; plastic or metal clips; retaining clips or springs; couplings; releasable attachments; and temporary adhesives, caulking, or sealants.

The moldings of the present invention may have a natural wood finish, or one that can be painted or stained. The present invention may be constructed from hardwoods such as mahogany, birch, white oak, red oak, maple, ash, walnut, or poplar; soft woods such as cedar, pine, Douglas fir, or redwood; or medium-density fiberboard, polyurethane, and other materials that can be formed to have the appearance of wood.

The moldings of the present invention may also be made of stone, tile, or various composite or synthetic materials that provide high durability as may be required in commercial structures such as hotels, museums, schools, churches, entertainment venues, and office buildings.

The moldings of the present invention may have design features of styles to complement the appearance of the room, including Victorian, country, traditional, southwest, colonial, or other architectural styles of the twentieth and earlier centuries.

It is another object of the invention for the baseboard moldings to accommodate and cover wiring and cables when the baseboard is surface-mounted on an interior wall near the floor.

It is a further object of the invention for the baseboard moldings to provide connections to other trim pieces, such as corner pieces or casings, in order to complete the wiring and cable connections in a structure, while minimizing penetrations in the wall studs.

The present invention may also make use of all or part of a previously installed non-removable baseboard as part of the support structure for the present invention.

Door and window casings of the present invention can be used to support and cover sections of the wiring and cables of a network; they are particularly useful in completing connections throughout the structure.

Cornice and crown moldings may also be used where convenient for the purpose of covering wiring and cables, again with the object of providing an appealing finish when they are surface-mounted on an interior wall near the ceiling. These can be particularly useful for connecting speakers, low-voltage lighting, and/or security monitoring devices. They may also be used to cover access openings in ceilings for the connection of devices mounted on the ceiling of the room. The inventive molding, mounted at the ceiling level, is also useful for covering wiring around the perimeter of a room, using fewer lineal feet than would be required by a combination of baseboards, door casings, and possibly window casings to circumnavigate an entire room.

Chair rails, or other horizontal trim pieces, may be used in a similar manner for providing a decorative cover for cables and wiring at different elevations between the floor and ceiling.

Vertical runs of wiring and cables can be achieved by the use of inventive vertical corner trim work, for either interior or exterior corners. Alternatively, vertical runs can also be accomplished by feeding wire vertically within the wall space between studs to connect wiring behind cornice moldings with wiring behind baseboards or door casing moldings.

Corner pieces of various styles are used to provide connections between various horizontal and vertical trim pieces.

In addition to actually carrying wiring and cables, the moldings of the present invention can be used to cover and camouflage functional wiring raceways and electrical conduits.

A finished appearance in any given layout may require the installation of sections of matching trim work which does not actually carry cables or wiring, if network capabilities are not presently needed for a particular section of a room.

It is a yet another object of the invention for the moldings to optionally have periodic control panels, switches, receptacles, jacks, and ports for the connection of various pieces of electronic equipment, as needed by the user.

The moldings of the present invention may be used in combination with other hardwired or wireless systems to complete an electronic system in a residential or commercial structure.

Depending on the network and connections needed for a particular residential or commercial structure, a combination of the interior and exterior trim, wall, floor, and ceiling penetrations and interior runs, and wiring raceways and conduits, may be used by the designer, builder, or end-user.

The moldings of the present invention may also be used to cover penetrations in the walls, floors, or ceilings in order to feed wires and cables from one room to another or to connect wires and cables to electrical jacks, ports, or other devices.

The moldings of the present invention may also be used to cover open slots in the walls that permit inspection of the wall space for signs of termites or other pest infestations.

The moldings of the present invention may also reduce installation time by providing surfaces for installing nails, screws, or staples, which are then hidden by the removable molding pieces. This feature eliminates the need for filling fastener indentations, sanding, priming, and finish painting or staining after installation. Surface treatments can be applied to the moldings prior to installation, with minimal need for touch-up of the exposed surfaces after installation Finally, unlike the currently available wiring conduits and raceways, the present invention provides an aesthetically-pleasing appearance, which complements the decor of the home or commercial structure in which it is installed.

DESCRIPTION OF PREFERRED EMBODIMENTS

Figure 1:
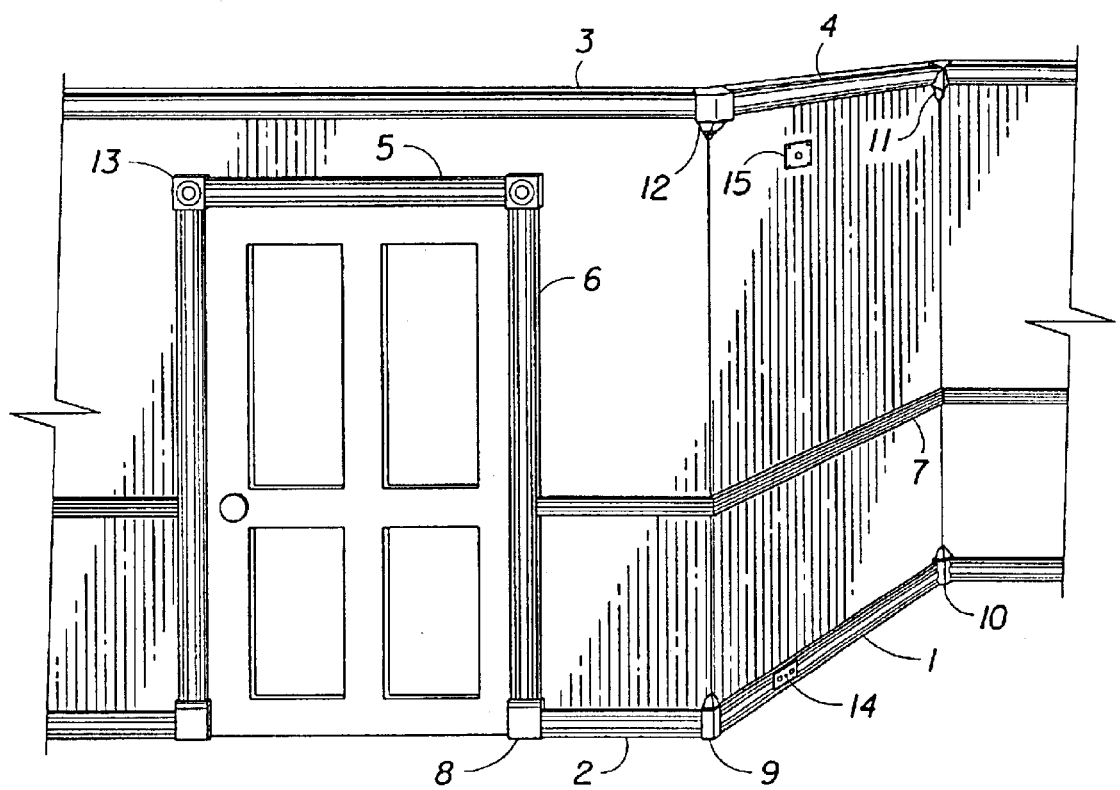
FIG. 1 is a partial perspective view illustrating the outward, finished appearance of the moldings of the present invention, which have been installed in the interior of a residence.

In accordance with the present invention, FIG. 1 shows interior walls and a door in a home with a system of decorative moldings of the present invention covering the low-voltage wiring and cables. Baseboard moldings 1, 2 have the appearance of decorative baseboard, but also provide channels or conduits for wiring and cables. Crown moldings 3, 4 are also designed to cover wiring and cables along the upper part of a room. Casing moldings 5, 6 around a doorway provide channels or conduits for home automation or networking cables and wiring; they are particularly useful for extending the electrical connections around doors and windows of rooms and throughout homes. Chair rail 7, an alternative decorative molding, provides a channel or conduit for connecting circuits and networks at a height a few feet above floor level. Plinth block 8 is an example of a millwork piece installed at the intersection of the baseboard 2 and the door casing 6. Each such piece has openings on the side that abuts the baseboard 2 and on the top that abuts the door casing 6. With this design, the plinth block 8 presents a finished appearance on its exposed surfaces, while permitting the passage of cables and wiring from the end of the baseboard 2 through the plinth block 8 and into the door casing 6. Millwork pieces such as the outside base corner 9, the inside base corner 10, the inside crown corner 11, the outside crown corner 12, and the casing corner block 13 are designed like the plinth block 8. As a result, adjacent moldings fit together tightly to form continuous millwork, with each molding enclosing a portion of a continuous passageway for wiring and cables. Devices may be connected to the wiring and cables at jack 14 and receptacle 15.

Figure 2:
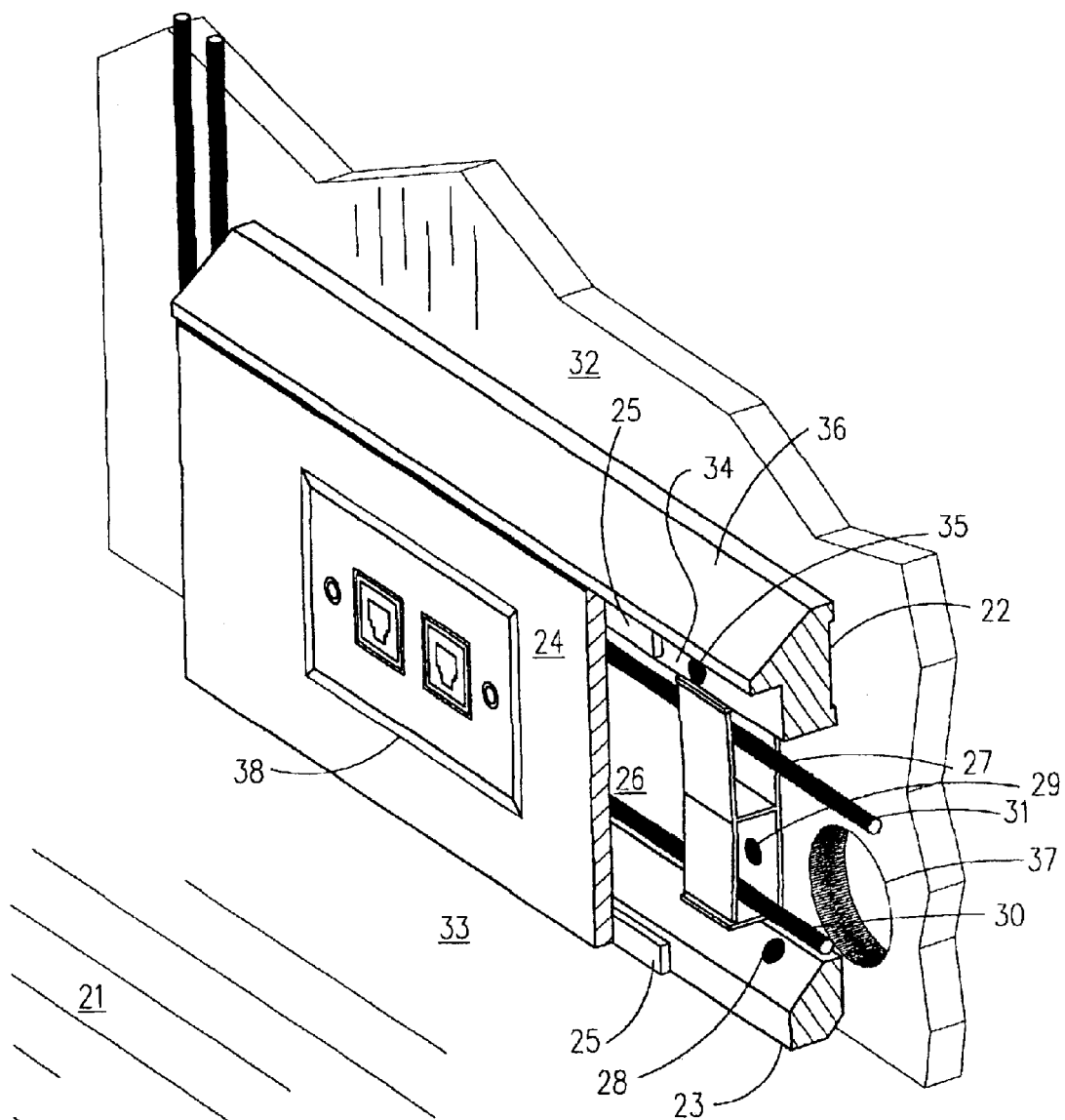
FIG. 2 is a fragmentary, partial cutaway view of a section of a three-piece baseboard installed according to the present invention.

FIG. 2 illustrates the features and functionality of a baseboard molding 21 made according to the present invention. The baseboard molding 21 has the appearance of classical or typical interior trim comprising a base cap 22, a furring strip 23, and a main board 24. The base cap 22 has a downward extending section that may be permanently or semi-permanently attached to the wall 32 by using nails, staples, or screws 35 on surface 34 that will not be seen when the baseboard molding 21 is fully assembled. The furring strip 23 provides support for the main board 24 and spacing for the channel 26. The furring strip 23 may be formed with an upwardly-beveled surface to provide a contact angle for simplifying installation of nails, staples or screws 28 when attaching the furring strip 23 to the wall 32 and/or the floor 33. The main board 24 is removably attached to the furring strip 23 and the base cap 22 with removable attachment means such as the hook and loop attachment strip 25 of Velcro TM shown in the figure. The spacing of the furring strip 23, the main board 24, and the base cap 22 creates a longitudinal channel 26 that may be used for the passage of wiring 30, cables 31, and associated devices. A series of brackets 27 may be installed at appropriate positions between the furring strip 23 and the base cap 22 for the purpose of providing support for the cables 31 and wiring 30. These brackets 27 may be attached to the wall 32 and/or the furring strip 23. The height of the brackets 27 may be sized to aid in the correct positioning of the base cap 22 during its initial installation. The baseboard molding 21 of the present invention has much utility. It conceals and protects wiring 30 and cables 31 as they pass along the lower perimeter of walls 32 of a room. The removable main board 24 may be fitted with outlets, jacks 38, or other connections for electronic devices. The main board 24 is removable to provide access to the channel 26 for installation or modification of the cables 31 and wiring 30. The main board 24 also covers access holes 37 to the wall space, which permit extension of the wiring 30 and cables 31 to adjacent rooms or connection to electrical devices that may be mounted on the wall 32 above the baseboard molding 21. If access holes 37 are made wide enough, the removable main board 24 also allows periodic inspection or treatment of the wall space for-termites or other pests. Attachment of the base cap 22 to the wall 32 along its non-exposed surface 34 means that the exposed base cap surface 36 is not marred by entry holes for the nails, staples, or screws that are traditionally used for installing baseboards. This feature, along with the use of reclosable fastener means on the main board 24, eliminates the time-consuming installation steps of filling nail or staple indentations with wood putty, sanding, and refinishing the exposed surfaces of the baseboard molding 21. If screws 28 are used for attaching the base cap 22 and/or the furring strip 23, these pieces may be removed in the future to facilitate home maintenance and redecorating activities, such as repainting, wallpapering, or refinishing floor surfaces.

Figure 3:
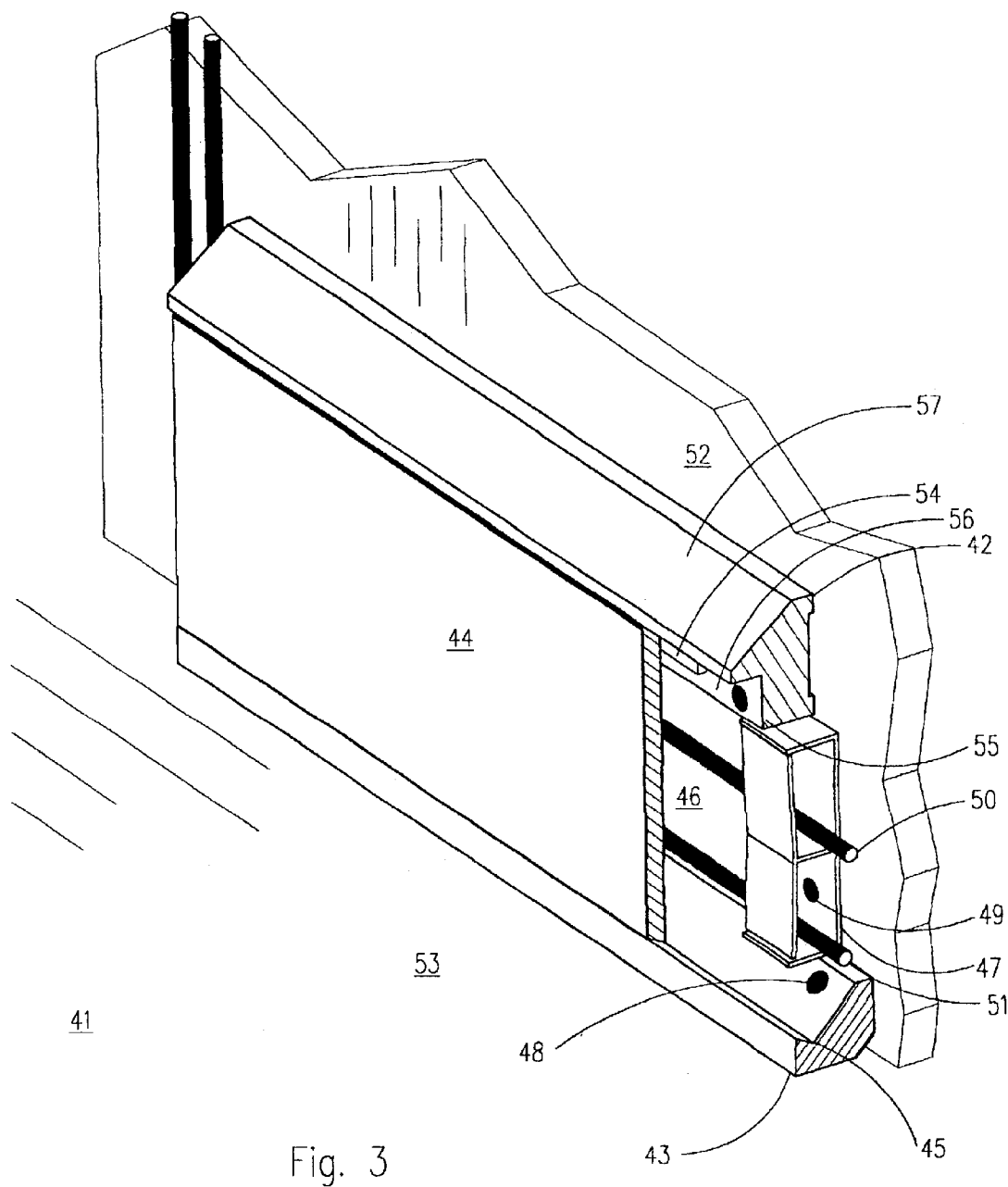
FIG. 3 is a fragmentary, partial cutaway view of a section of a three-piece baseboard installed according to an alternate embodiment of the present invention.

FIG. 3 illustrates the features and functionality of an alternative embodiment of the baseboard molding 41 of the present invention. The baseboard molding 41 has the appearance of classical or typical interior trim comprising a base cap 42, a furring strip 43, and a main board 44. The base cap 42 has a downward extending section that may be permanently or semi-permanently attached to the wall 52 by using nails, staples, or screws 55 on surface 56 that will not be seen when the baseboard molding 41 is fully assembled. The furring strip 43 extends outward from the wall to provide an interlocking connection 45 for support of the main board 44 and spacing for the channel 46. The furring strip 43 may have an upwardly beveled surface to provide a contact angle for simplifying installation of nails, staples or screws 48 attaching the furring strip 43 to the wall 52 and/or the floor 53. The main board 44 may be installed by inserting its lower beveled edge into the interlocking connection 45 in the furring strip 43, thus forming a vertical scarf joint, and then pressing the upper edge against the base cap 42 to secure-it with removable attachment means such as the hook and loop attachment strip 54 of Velcro TM shown in the figure. The spacing of the furring strip 43, the main board 44, and the base cap 42 creates a longitudinal channel 46 that may be used for the passage of cables 51, wiring 50, and associated devices. A series of brackets 47 may be installed at appropriate positions between the furring strip 43 and the base cap 42 for the purpose of providing support for the cables 51 and wiring 50. These brackets 47 may be attached to the wall 52 and/or the furring strip 43. The height of the brackets 47 may be sized to aid in the correct positioning for the base cap 42 during its initial installation. The baseboard molding 41 of the present invention has much utility. It conceals and protects wiring 50 and cables 51 as they pass along the lower perimeter of walls 52 of a room. The removable main board 44 may be fitted with outlets, jacks 58, or other connections for electronic devices. The main board 44 is removable to provide access to the channel 56 for installation or modification of the cables 51 and wiring 50. The main board 44 also covers access holes 57 to the wall space, which permits extension of the wiring 50 or cables 51 to adjacent rooms or connection to electrical devices that may be mounted on the wall 52 above the baseboard molding 41. If access holes 57 are made wide enough, the removable main board also allows periodic inspection or treatment of the wall space for termites or other pests. Attachment of the base cap 42 to the walls 52 along its non-exposed surface 56 means that the exposed base cap surface 59 is not marred by entry holes for the nails, staples, or screws that are traditionally used for installing baseboards. This feature, along with the use of reclosable fastener means on the main board 44, eliminates the time-consuming installation steps of filling nail or staple indentations with wood putty, sanding, and refinishing the exposed surfaces of the baseboard molding 41. If screws 48, 55 are used for attaching the base cap 42 and/or the furring strip 43, these pieces may be removed in the future to facilitate home maintenance and redecorating activities, such as repainting, wallpapering, or refinishing floor surfaces.

Figure 4:
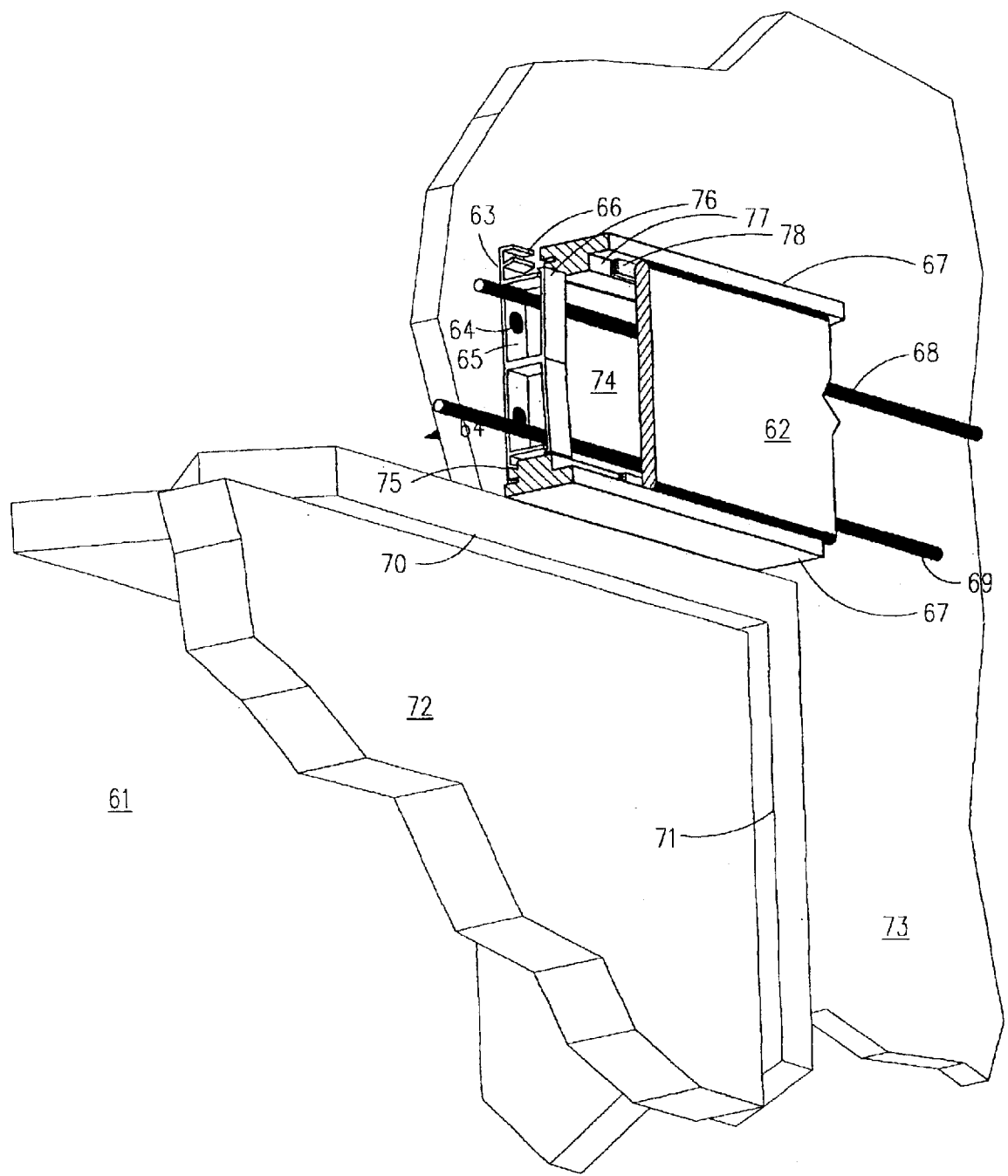
FIG. 4 is a fragmentary, partial cutaway view of sections of casing molding with a removable portion, installed according to the present invention.

FIG. 4 shows portions of a decorative casing molding 61 made according to the present invention. The casing molding 61 has the appearance of classical or typical interior trim. Casing sidewalls 67 have protrusions 75 for attachment to bracket 63, which are equipped with flexible snap-on attachment extensions 66. Bracket 63 is attached to wall 73 using nails, staples, or screws 64. Brackets may also be equipped with one or more enclosures 76 for supporting the wiring 69 and cables 68. Face board 62 may be removably attached to sidewalls 67 using removable attachment means such as the hook and loop attachment strip 78 of Velcro™ shown in the figure. The spacing of casing sidewalls 67 and face board 62 creates a channel 74 for passage of wiring 69 and cables 68. The casing assembly 61 has much utility in that it provides a finished decorative appearance when installed along the door jambs 70, 71 around the door 72. It conceals and protects wiring 69 and cables 68 as they pass around a doorway or window, and it permits completion of electrical connections around the perimeter surfaces of a room. Attachment of the casing sidewalls 67 using brackets 63 means that the exposed sidewall surfaces are not marred by entry holes for the nails, staples, or screws that are traditionally used for installing casings. This feature, along with the use of reclosable fastener means on the face board 62, eliminates the time-consuming installation steps of filling nail or staple indentations with wood putty, sanding, and refinishing the exposed surfaces of the casings. The face board 62 may also cover access holes to the wall space, which permits extension of the wiring 69 and cables 68 to adjacent rooms or connection to electrical devices that may be mounted on the wall surfaces 73 around the casing assembly 61. The casing assembly 61 may also provide support for associated electrical devices such as jacks or control switches (not shown). Since the sidewalls 67 and the face board 62 are removably attached, these pieces may be removed to facilitate home maintenance and redecorating activities, such as refinishing, repainting, or wallpapering.

Figure 5:
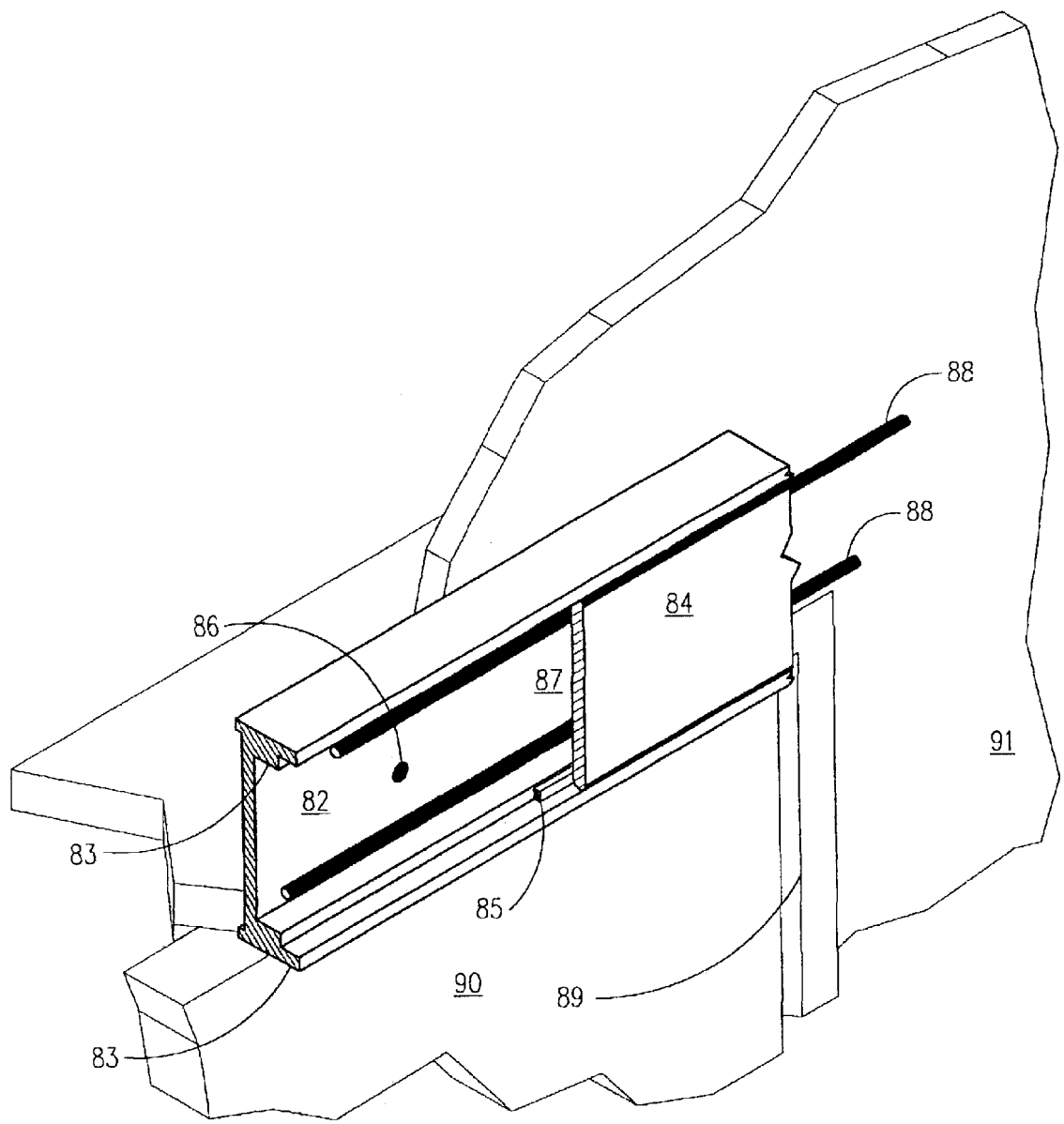
FIG. 5 is a fragmentary, partial cutaway view of a section of casing molding with a removable portion, installed according to an alternate embodiment of the present invention.

FIG. 5 shows portions of an alternative decorative casing molding 81 made according to the present invention. The casing molding 81 has the appearance of classical or typical interior trim. Casing sidewalls 83 are connected to a back plate 82, which in turn is attached to the wall 91 around the door jamb 89 using nails, staples, or screws 86. The face plate 84 may be removably attached to sidewalls 83 using removable attachment means such as hook and loop attachment strips 85 of Velcro™ 85 shown in the figure. The spacing of casing sidewalls 83 and face plate 84 creates a channel 87 for passage of wiring and cables 88. The casing assembly 81 has much utility in that it provides a finished decorative appearance when installed along doorjamb 89 around door 90. It conceals and protects wiring and cables 88 as they pass around a doorway or window, and it permits completion of electrical connections around the perimeter surfaces of a room. Attachment of the casing sidewalls 83 to back plate 82 means that the exposed sidewall surfaces are not marred by entry holes for nails, staples, or screws that are traditionally used for installing casings. This feature, along with the use of reclosable fastener means on the face plate 84, eliminates the time-consuming installation steps of filling nail or staple indentations with wood putty, sanding, and refinishing the exposed surfaces of the casings. The face plate 84 may also cover access holes to the wall space, which permits extension of the wiring or cables 88 to adjacent rooms or connection to electrical devices that may be mounted on the wall surfaces 91 around the casing. The casing assembly 81 may also provide support for associated electrical devices such as jacks or control switches (not shown). Since the sidewalls 83 and the face plate 84 are removably attached, these pieces may be removed to facilitate home maintenance and redecorating activities, such as refinishing, repainting, or wallpapering.

Figure 6:
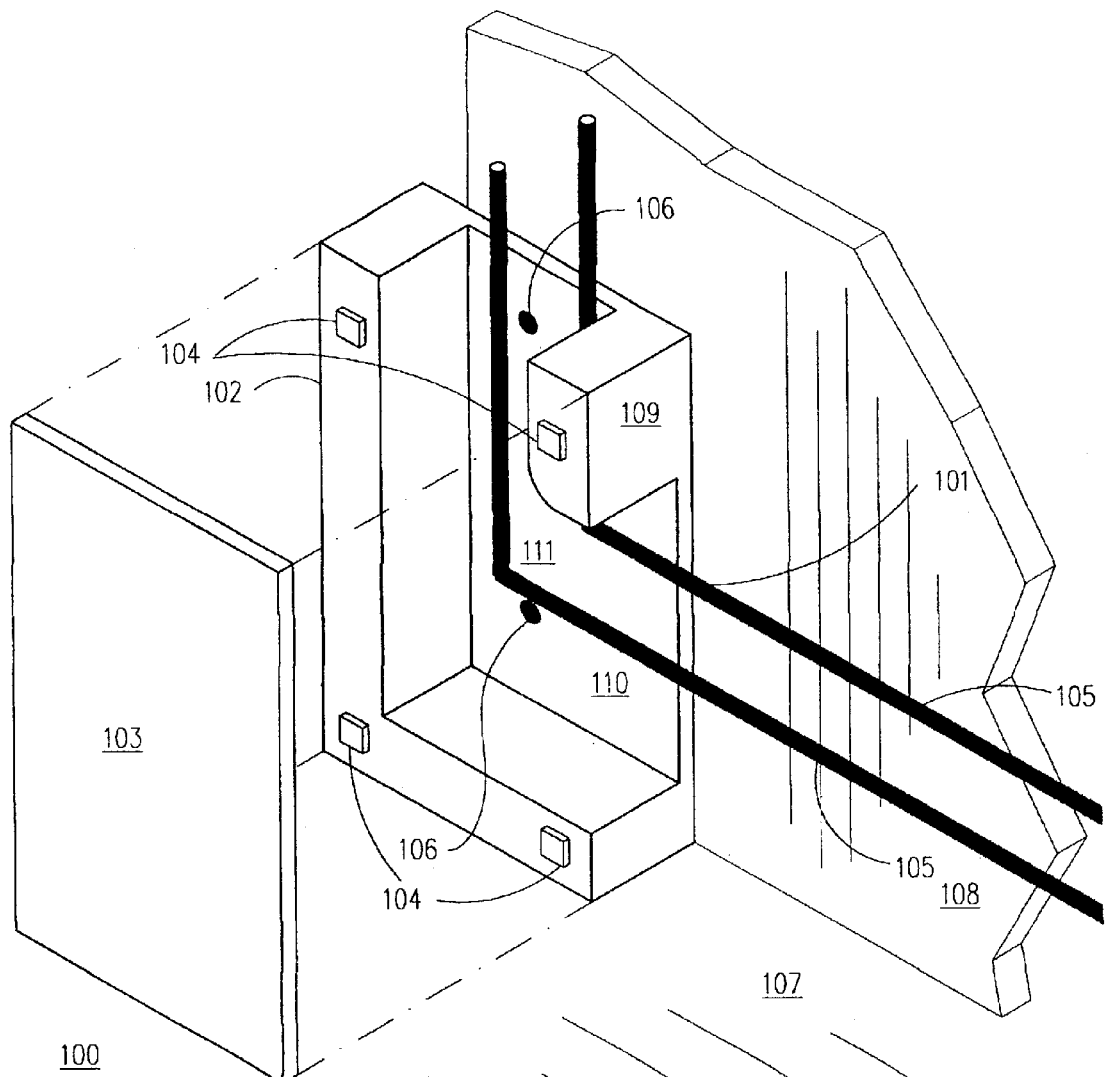
FIG. 6 is an exploded view of a plinth block with a removable faceplate installed according to the present invention.

FIG. 6 shows an exploded view of a plinth block 100 made according to the present invention. Plinth blocks are typically used at the base of a door casing, or they may be used with a window casing that extends to the floor 107. The plinth block 100 is constructed with a back plate 101 that has front extensions 102, 109, which together form a channel 110 for passage of cables and wiring 105. The back assembly 101 is attached to the wall 108 using nails, staples, or screws 106, which are driven through back plate surface 111. The face plate 103 is removably attached to the front extensions 102, 109 by removable attachment means such as the hook and loop attachment strips 104 of Velcro™ shown in the figure. The plinth block 100 has much utility in that it provides a finished decorative appearance when installed at the base of a doorway. It conceals and protects wires and cables and provides a critical transition function between baseboards and door casings to permit completion of electrical connections around the perimeter-surfaces of a room. Attachment of the back plate 101 to the wall 108 through surface 111 means that the exposed surfaces of the front extensions 102, 109 are not marred by entry holes of the nails, staples, or screws that are traditionally used for installing plinth blocks. This feature, along with the use of reclosable fastener means on the face plate 103, eliminates the time-consuming installation steps of filling nail or staple indentations with wood putty, sanding, and refinishing the exposed surfaces of the plinth block 100. Since the back assembly 101 and the face plate 103 are removably attached, these pieces may be removed to facilitate home maintenance and redecorating activities, such as refinishing, repainting, wallpapering, or refinishing floor surfaces.

Figure 7:
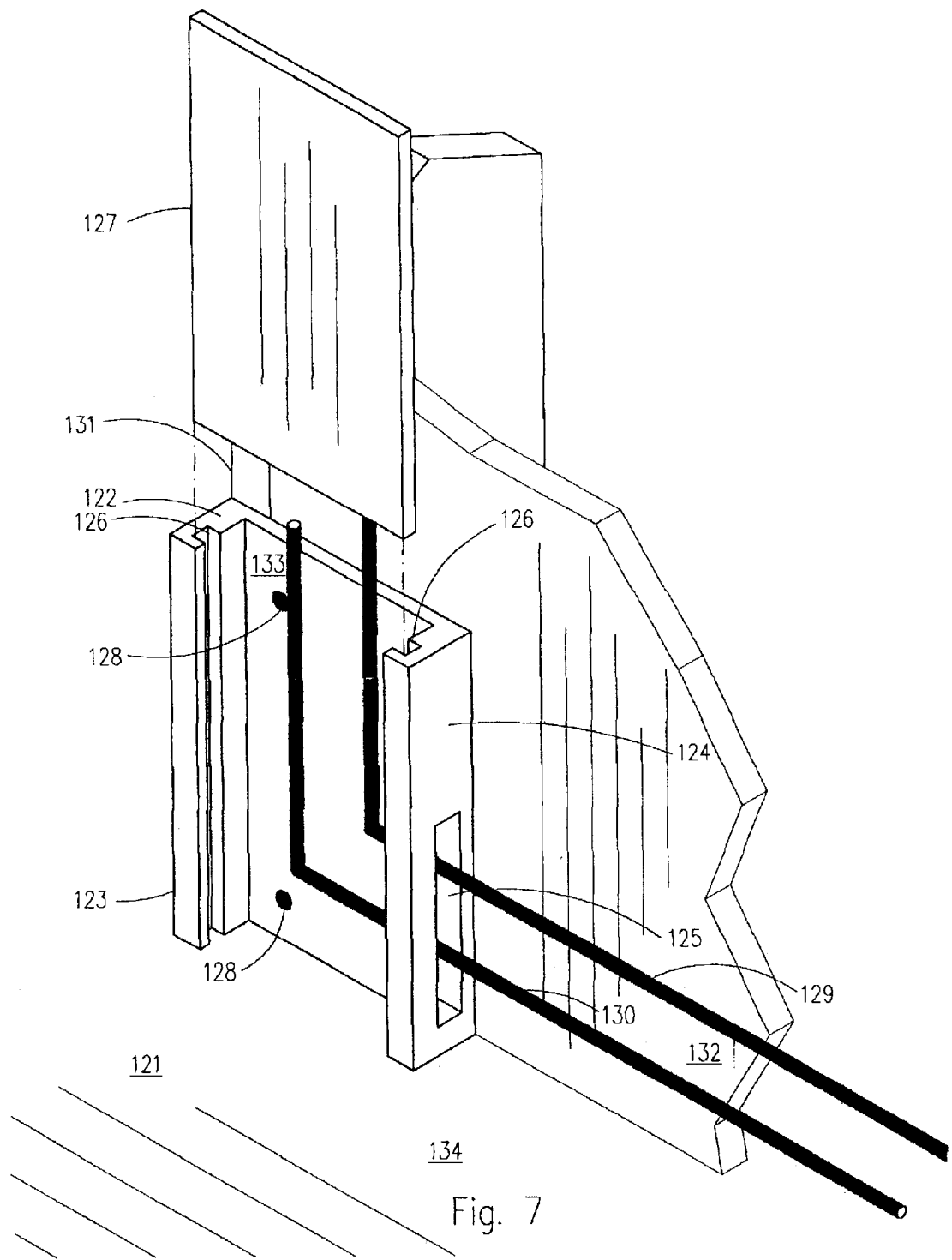
FIG. 7 is an exploded view of a plinth block with a removable faceplate installed according to an alternate embodiment of the present invention.

FIG. 7 shows an exploded view of an alternative embodiment of plinth block 121 made according to the present invention. Plinth blocks are typically used at the base of a door casing, or they may be used with a window casing that extends to the floor 134. The plinth block 121 is constructed with a back plate 122 that has front extensions 123, 124, which together form a channel 133 for passage of cables 130 and wiring 129. Front extension 124 has an opening 125 for passage of the cables 130 and wiring 129 between the plinth block 121 and an adjacent baseboard (not shown). The back assembly 122 is attached to the wall using nails, staples, or screws 128 driven through back plate surface 135. The removable face plate 127 may be attached to the front extensions 123, 124, in several ways, including the example shown, in which the edges of the face plate 127 are slid into grooves 126 in front extensions 123, 124. The plinth block 121 has much utility in that it provides a finished decorative appearance when installed at the base of a doorway or window casing. It conceals and protects wires and cables and provides a critical transition function between baseboards and casings to permit completion of electrical connections around the perimeter surfaces of a room. Attachment of the back plate 122 to the wall 132 through back plate surface 135 means that the exposed surfaces of the extensions 123, 124 are not marred by entry holes for the nails, staples, or screws that are traditionally used for installing plinth blocks. This feature, along with the methods used for removably installing the face plate 127, eliminates the time-consuming installation steps of filling nail or staple indentations with wood putty, sanding, and refinishing the exposed surfaces of the plinth blocks. Since the back plate 122 and the face plate 127 are removably attached, these pieces may be removed to facilitate home maintenance and redecorating activities, such as refinishing, repainting, wallpapering, or refinishing floor surfaces.

Figure 8:
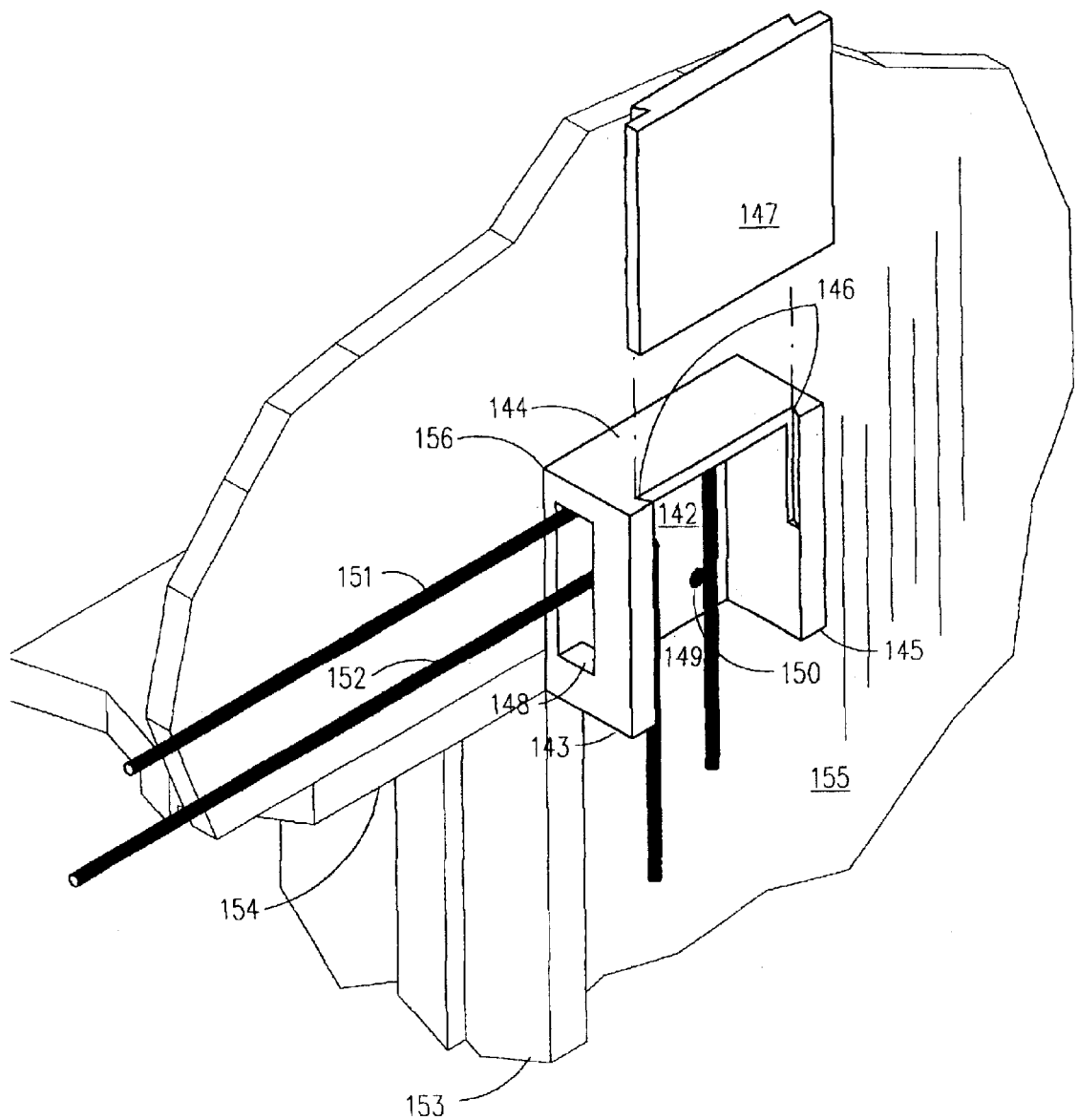
FIG. 8 is an exploded view of a corner block with a removable faceplate installed according to the present invention.

FIG. 8 illustrates an exploded view of an upper casing corner block 141 made according to the present invention. The back plate 156 is attached to wall 155 at the upper corner of a door jamb 153, 154 to provide a transition between the casings (not shown) at the side and top of the door or window. The back plate 156 can be attached with nails, staples, or screws 150 driven through back plate surface 142. The sidewalls 143, 144, 145 form channel 148, 149 for the passage of wiring 151 and cables 152 between the side and top casings (not shown). The sidewalls 143, 144, 145 also provide support for the removable face plate 147. The removable face plate 147 may be held in place in several different ways, including the example shown, in which the edges of the face plate 147 are slid into grooves 146 formed in sidewalls 143, 144, thus forming a partial dovetail joint. The casing corner block 141 has much utility in that it provides a finished decorative appearance when installed at the top of a doorway or window casing. It conceals and protects wiring and cables and provides a critical transition function between side and top casings to permit completion of electrical connections around the perimeter surfaces of a room. Attachment of the back assembly 156 through back plate surface 142 means that the exposed surfaces of the sidewalls 143, 144, 145, 157 are not marred by entry holes for the nails, staples, or screws that are traditionally used for installing casing corner blocks. This feature, along with the methods used for removably installing the face plate 147, eliminates the time-consuming installation steps of filling nail or staple indentations with wood putty, sanding, and refinishing the exposed surfaces of the casing corner blocks. Since the back plate 156 and the face plate 147 are removably attached, these pieces may be removed to facilitate home maintenance and redecorating activities, such as refinishing, repainting, wallpapering, or refinishing floor surfaces.

Figure 9:
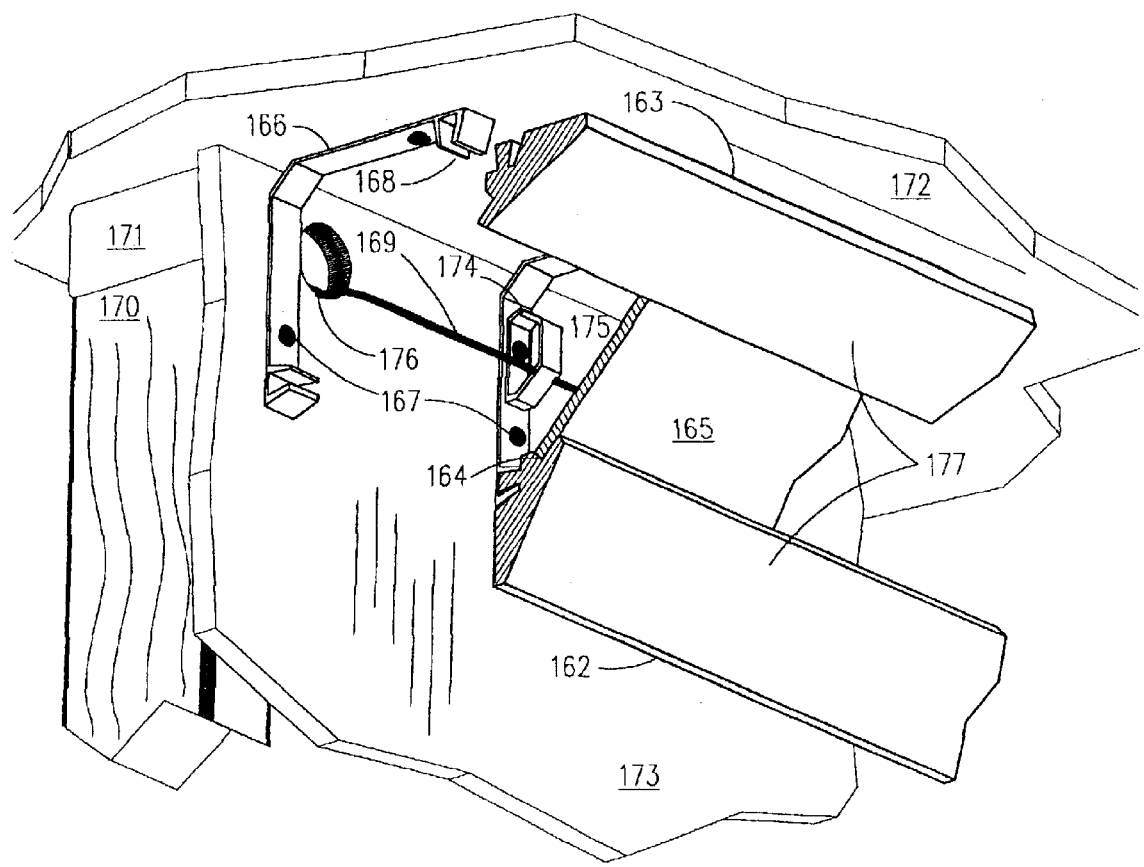
FIG. 9 is a fragmentary, partial cutaway view of a section of crown molding installed according to the present invention.

FIG. 9 represents an example of a crown molding 161 made according to the present invention. The crown molding 161 may be constructed or built up from multiple pieces of molding to give the desired finished appearance. Brackets 166 are attached to the wall 173 and ceiling 172 using nails, staples, or screws 167. Brackets 166 have attachment extensions 168 at each end for holding the lower crown molding section 162 tightly against the wall 173 and for holding the upper crown molding section 163 tightly to the ceiling 172. The resulting gap between the upper and lower crown molding sections 163, 162 is fitted with a removable face plate 165, which is placed into the gap so that it lies against the back side of both the upper and lower crown molding sections 163, 162. The removable face plate 165 may be held in place in a number of ways, including the example shown, in which the removable face plate 165 is supported by a rabbet edge 164 of the lower crown molding section 162. After it is installed, the crown molding 161 defines a channel 175 for wiring and cables 169, which may be supported on the brackets 166 by cable clamps 174. The crown molding 161 of the present invention has much utility. It conceals and protects wires and cables as they pass along the upper perimeter surfaces of a room. The removable face plate 165 provides access to the channel 175 for installation or modification of the cables and wires. The face plate 165 also covers access holes 176 to the wall space, which permits extension of the wiring and cables 169 to adjacent rooms and connection to electrical devices that may be mounted on surfaces of the adjacent wall 173 or ceiling 172. If access holes 176 are made wide enough, the removable face plate 165 also allows periodic inspection or treatment of the wall space for termites or other pests. Since the upper and lower crown molding sections 163, 162 are attached to the wall 173 and ceiling 172 using brackets 166, the exposed surfaces of the crown molding 162 are not marred by entry holes for the nails, staples, or screws that are traditionally used for installing crown molding. This feature, along with the use of a removable face plate eliminates the time-consuming installation steps of filling nail or staple indentations with wood putty, sanding, and refinishing the exposed surfaces of the crown molding. The temporary attachment of the crown molding pieces also permits their removal to facilitate home maintenance and redecorating activities, such as refinishing, repainting, or wallpapering.

Figure 10:
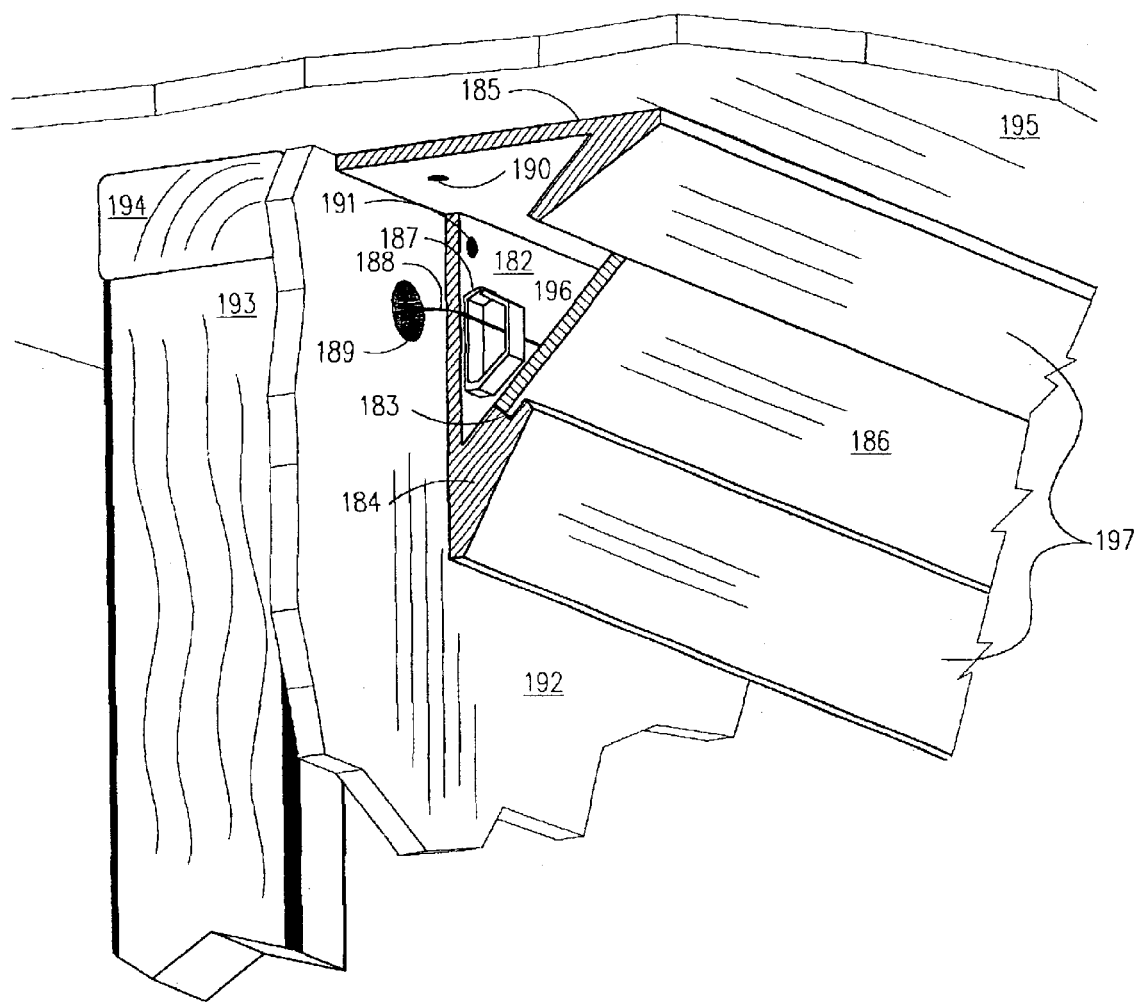
FIG. 10 is a fragmentary, partial cutaway view of a section of crown molding installed according to an alternate embodiment of the present invention.

FIG. 10 represents an alternative embodiment of the crown molding 181 made according to the present invention. The crown molding 181 may be constructed or built up from multiple pieces of molding to give the desired finished appearance. Upper crown molding section 185 and lower crown molding section 184 are attached to the ceiling 195 and wall 192, respectively, using nails, staples, or screws 190, 191 driven through the non-exposed surfaces 182 of the upper and lower crown moldings 185, 184. The resulting gap between the upper and lower crown molding sections 184, 185 is then fitted with a removable face plate 186, which is placed into the gap so that it lies against the back sides of the upper and lower crown molding sections 184, 185. The removable face plate 186 may be held in place in a number of ways, including the example shown, in which the removable face plate 186 is supported by a rabbet edge 183 of the lower crown molding section 184. After it is installed, the crown molding 181 defines a channel 196 for wiring and cables 188 which can be supported by cable clamps 187. The crown molding 181 of the present invention has much utility. It conceals and protects wires and cables as they pass along the upper perimeter surfaces of the room. The removable face plate 186 provides access to the channel 196 for installation or modification of the cables and wires. The face plate 186 also covers access holes 189 to the wall space, which permits extension of the wiring and cables to adjacent rooms and connection to electrical devices that may be mounted on the surfaces of wall 192 or ceiling 195. If access holes 189 are made wide enough, the removable face plate 186 also allows periodic inspection or treatment of the wall space for termites or other pests. Because the upper and lower crown molding sections 185, 184 are attached to the wall 192 and ceiling 195 with nails, staples, or screws 190, 191 along its unexposed surface 182, the exposed crown molding section surfaces 197 are not marred by entry holes for the nails, staples, or screws that are traditionally used for installing crown molding. This feature, along with the use of removable faceplate 186, eliminates the time-consuming installation steps of filling nail or staple indentations with wood putty, sanding, and refinishing the exposed surfaces of the crown molding. The use of screws 190, 191 for attachment of the crown molding pieces also permits their removal to facilitate home maintenance and redecorating activities, such as refinishing, repainting, or wallpapering.

Figure 11:
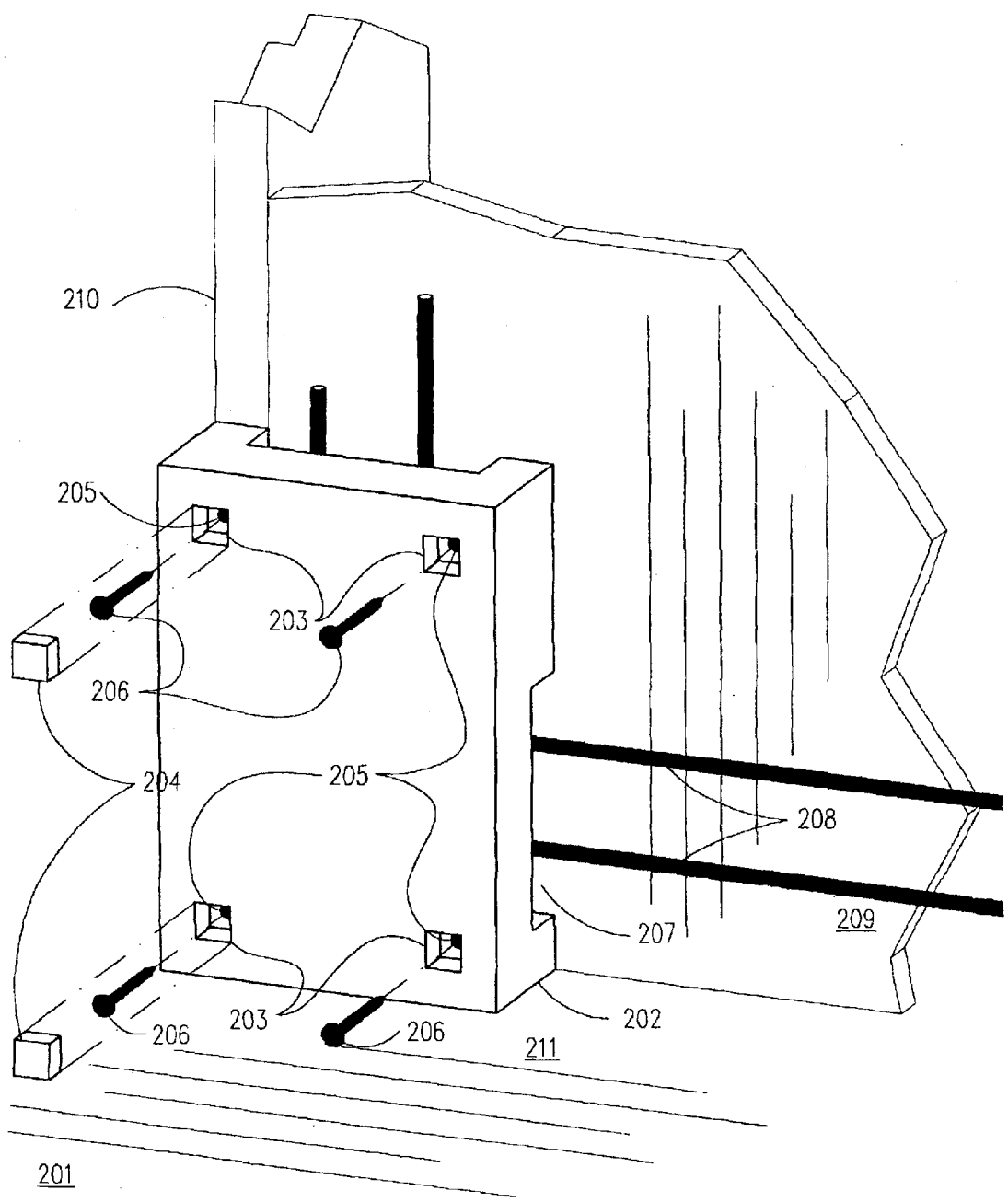
FIG. 11 is an exploded view of an alternative embodiment of a plinth block of the present invention.

FIG. 11 represents another embodiment of the plinth block of the present invention. Plinth block 201 consists of the support block 202, and inserts 204 that fit into recesses 203 to cover nails or screws 206 used to attach support block 202 through holes 205 into the wall 209. Support block 202, which may be constructed from a single piece or multiple pieces, provides a generally right-angle channel 207 for the passage of wiring and cables 208 from between adjacent baseboards and casings (not shown). Inserts 204 fit into recesses 203, but are removable to provide access to screws 206 in order to facilitate future removal of plinth block 201. The plinth block 201 has much utility in that it provides a finished decorative appearance when installed at the base of a doorway or window casing. It conceals and protects wires and cables and provides a critical transition function between baseboards and casings to permit completion of electrical connections around the perimeter surfaces of a room. Attachment of the support structure 202 with recessed screws 206 through holes 205 means that the exposed surfaces of the support structure 202 are not marred by entry holes for the nails, staples, or screws that are traditionally used for installing plinth blocks. This feature, along with the use of inserts 204, eliminates the time-consuming installation steps of filling nail or staple indentations with wood putty, sanding, and refinishing the exposed surfaces of the plinth blocks. Since the plinth block 201 is removably attached, it may be removed to facilitate home maintenance and redecorating activities, such as refinishing, repainting, wallpapering, or refinishing floor surfaces.

We claim:

1. A system of one or more interior moldings selected from baseboards, crown moldings, door casings, window casings, chair rails, and corner pieces, one of said moldings having:
    at least one base cap designed to be mounted onto one or more interior surfaces of a room, the surfaces being selected from the group consisting of walls, floors, and ceilings;
    a separate front plate having an exposed front face and a back side; and
    means for removably attaching the front plate to the base cap;
the molding being configured to define a passage for wiring and cables between the back side of the front plate and the interior surfaces themselves onto which the base cap is mounted.

2. The system of claim 1 wherein the means for removably mounting the front plate to the support section is selected from a hook and loop fastening system; reclosable fasteners; interlocking joinery, dovetailing, mating, and matching configurations; retaining clips; springs; double-stick foam tape; push fasteners; row boat fasteners; removable tape; and temporary adhesives.

3. The system of claim 1 which further includes at least one electrical receptacle mounted in the molding.

4. The system of claim 1 which further includes a series of brackets affixed to the interior surface, the brackets being configured to support the wiring and cables behind the back side of the front plate.

5. A baseboard molding having:
    a base cap having a downward extending section and a second support strip designed to be mounted horizontally and parallel one to the other onto one or more interior surfaces of a room, the surfaces being selected from the group consisting of walls and floors;
    a separate front plate having an exposed front face and a back side and further having a top side and a bottom side; and
    means for removably attaching the bottom side of the front plate to the second support strip and the top side of the front plate to the base cap;
the molding being configured to define a passage for wiring and cables between the back side of the front plate and the interior surfaces themselves onto which the base cap and the second support strip are mounted.

6. The system of claim 5 wherein the means for removably attaching the front plate to the support strips is selected from a hook and loop fastening system; reclosable fasteners; interlocking joinery, dovetailing, mating, and matching configurations; retaining clips; springs; double-stick foam tape; push fasteners; row boat fasteners; removable tape; and temporary adhesives.

7. The system of claim 5 which further includes at least one electrical receptacle mounted in the molding.

8. The system of claim 5 which further includes a series of brackets affixed to the wall, the brackets being configured to support the wiring and cables behind the back side of the front plate.

9. A casing selected from door casings and window casings, each casing having:
    a longitudinal casing bracket having flexible, spaced-apart extensions;
    two spaced-apart sidewalls, each of the sidewalls having a front edge and a back edge, the back edge of the sidewalls mating to the extensions on the casing bracket;
    a front plate having an exposed front face and a back side; and
    means for removably attaching the front plate to the front edges of the sidewalls;
the casing being configured to form a passage for wiring and cables between the back side of the front plate and the interior surfaces to which the support plate is attached.

10. The casing of claim 9 wherein the means for removably attaching the front plate to the casing bracket is selected from a hook and loop fastening system; reclosable fasteners; interlocking, dovetailing, mating, and matching configurations; retaining clips; springs; double-stick foam tape; push fasteners; row boat fasteners; removable tape; and temporary adhesives.

11. The casing of claim 9 which further includes at least one electrical receptacle mounted in the casing.

12. The casing of claim 9 which further includes one or more wiring brackets affixed to the interior surface behind the front plate, the wiring brackets being configured to support the wiring and cables.

13. A casing selected from door casings and window casings, each casing having:

a unitary back plate designed to be mounted onto one or more interior wall surfaces of a room;

two parallel spaced-apart sidewalls extending outwardly from the back plate, each of the sidewalls having a front edge and a recessed edge;

a separate front plate having an exposed front face and a back side; and means for removably attaching the front plate to the recessed edges of the sidewalls while leaving a portion of the front edge of the sidewalks exposed;

the casing being configured to define a passage for wiring and cables between the back side of the front plate and the back plate.

14. The casing of claim 13 wherein the means for removably attaching the front plate to the recessed edges of the sidewalls is selected from a hook and loop fastening system; reclosable fasteners; interlocking joinery, dovetailing, mating, and matching configurations; retaining clips; springs; double-stick foam tape; push fasteners; row boat fasteners; removable tape: and temporary adhesives.

15. The casing of claim 13 which further includes at least one electrical receptacle mounted in the casing.

16. The casing of claim 13 which further includes a series of brackets affixed to the unitary back plate, the brackets being configured to support and organize the wiring and cables behind the back side of the front plate.

17. A crown molding having:

two or more generally L-shaped brackets having ends forming two rows of flexible extensions;

an upper crown molding section having an edge for mating with the first row of flexible extensions;

a lower crown molding section having an edge for mating with the second row of flexible extensions;

a front plate having an exposed front face and a back side; and means for removably attaching the front plate to the crown molding sections;

the crown molding being configured to form a passage for wiring and cables between the back side of the front plate and the interior surfaces to which the brackets are attached.

18. The crown molding sections of claim 17 wherein the means for removably attaching the front plate to the crown molding sections is selected from a hook and loop fastening system; reclosable fasteners; interlocking, dovetailing, mating, and matching configurations; retaining clips; springs; double-stick foam tape; push fasteners; row boat fasteners; removable tape; and temporary adhesives.

19. The crown molding of claim 17 which further includes at least one electrical receptacle mounted in the molding.

20. The crown molding of claim 17 which further includes one or more wiring brackets affixed to the interior surface behind the front plate, the wiring brackets being configured to support the wiring and cables.

21. A crown molding having:

an upper crown molding section designed to be mounted onto a ceiling surface, the upper crown molding section having a projection with an exposed face and a back side;

a separate lower crown molding section designed to be mounted onto the wall surface, the lower crown molding section having a projection with an exposed face and a back side;

a separate face plate having an exposed front face and a back side; and means for removably attaching the face plate to the back side of the projection on the upper crown molding section and the back side of the projection on the lower crown molding section;

the crown molding being configured to define a passage for wiring and cables between the back side of the front plate and the upper crown molding section and the lower crown molding section.

22. The crown molding of claim 21 wherein the means for removably attaching the front plate to the crown molding sections is selected from a hook and loop fastening system; reclosable fasteners; interlocking joinery, dovetailing, mating, and matching configurations; retaining clips; springs; double-stick foam tape; push fasteners; row boat fasteners; removable tape; and temporary adhesives.

23. The crown molding of claim 21 which further includes at least one electrical receptacle mounted in the crown molding.

24. The crown molding of claim 21 which further includes a series of brackets affixed to the interior surface behind the front plate, the brackets being configured to support the wiring and cables behind the back side of the front plate.

25. A corner block selected from a casing corner block and a plinth block, said corner block having:

at least one rectangular back plate designed to be mounted onto one or more interior surfaces of a room;

a separate face plate having an exposed front face and a back side; and means for removably attaching the face plate to the back plate;

the corner block being configured to define a generally right-angle channel for passage of wiring and cables between the back side of the face plate and the back plate.

26. The corner block of claim 25 wherein the means for removably attaching the front plate to the support section is selected from a hook and loop fastening system: reclosable fasteners; interlocking joinery, dovetailing, mating, and matching configurations; retaining clips; springs; double-stick foam tape: push fasteners; row boat fasteners; removable tape; and temporary adhesives.

27. The corner block of claim 25 wherein the support section has extensions, and the back side of the front plate is removably attached to the extensions of the support section.

28. The corner block of claim 25 wherein the support section has two sidewalls, each of the sidewalls having a groove, and the front plate has edges which are slidably received into the grooves in the sidewalls.

* * * * *